United States Patent [19]

Kura

[11] Patent Number: 4,972,936
[45] Date of Patent: Nov. 27, 1990

[54] CONVEYING SYSTEM

[75] Inventor: Tetsuzo Kura, Saitama, Japan

[73] Assignee: Tsubakimoto Chain Co., Japan

[21] Appl. No.: 290,781

[22] Filed: Dec. 28, 1988

[51] Int. Cl.$^5$ .............................................. B65G 29/00
[52] U.S. Cl. ................................. 198/465.1; 198/742; 198/465.2
[58] Field of Search ............... 198/465.1, 465.2, 346.1, 198/574, 742; 414/911, 280

[56] References Cited

U.S. PATENT DOCUMENTS

| | | | |
|---|---|---|---|
| 4,056,186 | 11/1977 | Hill | 198/465.1 X |
| 4,116,324 | 9/1978 | Burmeister | 198/465.1 |
| 4,552,260 | 11/1985 | Teagno et al. | 198/465.1 X |
| 4,705,445 | 11/1987 | Morita et al. | 198/346.1 X |
| 4,752,176 | 6/1988 | Linder | 414/278 |

Primary Examiner—Joseph J. Rolla
Assistant Examiner—Cheryl L. Gastineau
Attorney, Agent, or Firm—Howson & Howson

[57] ABSTRACT

In a system for conveying metal coils or other heavy articles using multiple conveyors, the articles are conveyed on carriers which pass from one conveyor to another and thereby remain associated with the conveyed articles throughout the conveying process. The conveying system comprises an entry conveyor, a lateral feed conveyor and an exit conveyor. Each of the entry and exit conveyors comprises a storage conveyor section for loaded carriers, a return conveyor section for empty carriers, and a traversing section. The storage conveyor section utilizes a set of reciprocating drive frames having pins for selectively engaging and disengaging the carriers to effect stepwise movement of the carriers along the conveyor section. The lateral feed conveyor is a high speed, electrically driven car having the capability of taking on a loaded carrier and discharging an unloaded carrier and vice-versa.

14 Claims, 15 Drawing Sheets

CONVEYING SYSTEM

BRIEF SUMMARY OF THE INVENTION

This invention relates to conveyor systems, and more particularly to a conveyor system for transporting metal coils between processing stations, for example in an iron works.

Conventionally, coils are sorted and transported by a system of conveyors comprising a plurality of take-in conveyors, a plurality of take-out conveyors, and an intermediate conveyor which runs perpendicular to the directions of the take-in and take-out conveyors. Coils are transported by carriers on the conveyors, but are transferred from one carrier to another as they are moved from one conveyor to another. This transfer of coils from one carrier to another is carried out by means of coil transfer devices which are not only structurally complex, but liable to cause damage to the coils.

In the conventional transfer system, information on each coil is stored electronically, and is transferred from one memory to another each time a coil is transferred from one conveyor to another.

The take-in and take-out conveyors in a conventional coil transfer system utilize a walking beam, and the intermediate conveyor, which typically comprises two or more recirculating conveyors arranged end-to-end, utilizes high saddles, or low saddles in combination with lifters. In these prior systems, the take-in and take-out conveyors provide no buffer storage function. The recirculating intermediate conveyors require a deep foundation for the lower runs, which significantly increases the construction cost. The use of multiple recirculating conveyors further complicates the construction of the system and increases its cost.

The principal object of this invention is to overcome the above-described problems of the conventional coil transfer system, particularly the inconveniences and drawbacks resulting from the transfer of coils separately from the carriers. It is also an object of the invention to reduce equipment costs in a coil conveying system.

In accordance with this invention, each storage conveyor is provided with a series of driving frames which are arranged along the path of movement of the coil transporting carriers on the conveyor. The driving frames are arranged so that they move together in reciprocating movement along the path. The pitch of the series of driving frames is greater than the length of each carrier in its direction of movement, and the driving frames are reciprocable along the path through a distance which is at least as great as the pitch of the frames, and preferably equal to or slightly greater than the pitch of the frames.

The driving frames have engaging means which are selectively engageable with, and disengageable from, the carriers so that the carriers can be transported along the conveying path in close relationship to one another in the desired direction by reciprocating movement of the driving frames.

A lateral feed conveyor is provided to connect the terminal end of one storage conveyor with the starting end of another storage conveyor, and is capable of transferring carriers from one conveyor to the other.

With the driving frames at the rearward end of their stroke, if the storage conveyor is not filled, the engaging means on the driving frames are brought into engagement with carriers as they arrive at the starting end of the storage conveyor, and into engagement with any carriers already on the storage conveyor. Coils are loaded onto the carriers at the starting end of the storage conveyor. By reciprocating movement of the driving frames, the loaded carriers are sequentially advanced forward and stored on the storage conveyor.

A lateral feed car, preferably a high speed electrically driven carrier, stops at the terminal end of the storage conveyor. A loaded carrier is transferred to the lateral feed car, and the lateral feed car then travels at high speed to the starting end of a second storage conveyor. The loaded carrier is then transferred from the lateral feed car to the second storage conveyor and carried along the second storage conveyor by reciprocating movement of driving frames.

The movement of a loaded carrier from the terminal end of a storage conveyor to the lateral feed conveyor or from the lateral feed conveyor to the starting end of a storage conveyor is computer-controlled. It is unnecessary to transfer coil information between memories associated with the respective conveyors. As the carriers are transferred along with the coils, it is only necessary to transfer the carrier number in order to keep track of the coil information.

Further objects and advantages of the invention will be apparent from the following detailed description.

DETAILED DESCRIPTION

Figure 17:
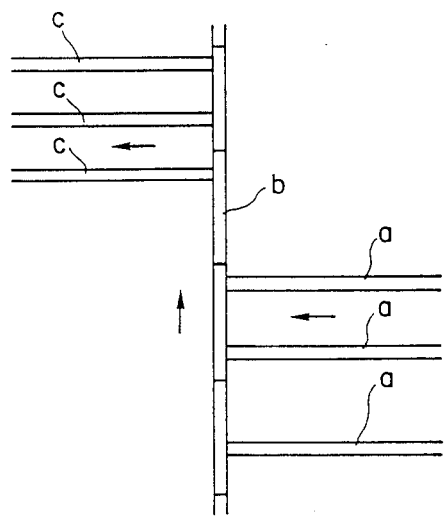
FIG. 17 is a schematic diagram illustrating the layout of a conventional coil storage and conveying system in accordance with the prior art.

Referring first to FIG. 17, which shows a coil conveying system in accordance with the prior art, coils are transported from a plurality of take-in conveyors (a) to a plurality of take-out conveyors (c) through an intermediate conveyor (b), the latter being typically made up of a plurality of separate recirculating conveyors arranged end-to-end. Coils are transferred from conveyor (a) to conveyor (b) and from conveyor (b) to conveyor (c) by coil transfer devices which remove the coils from their carriers and place them on new carriers, thereby giving rise to a likelihood of damage to the coils and also making it necessary to transfer coil information from one memory to another each time a transfer takes place. Conveyors (a) and (c) do not perform a buffer storage function. Conveyor (b) requires an expensive deep foundation, and is complicated because it is made up of several separate recirculating conveyors arranged end-to-end.

Figure 1:
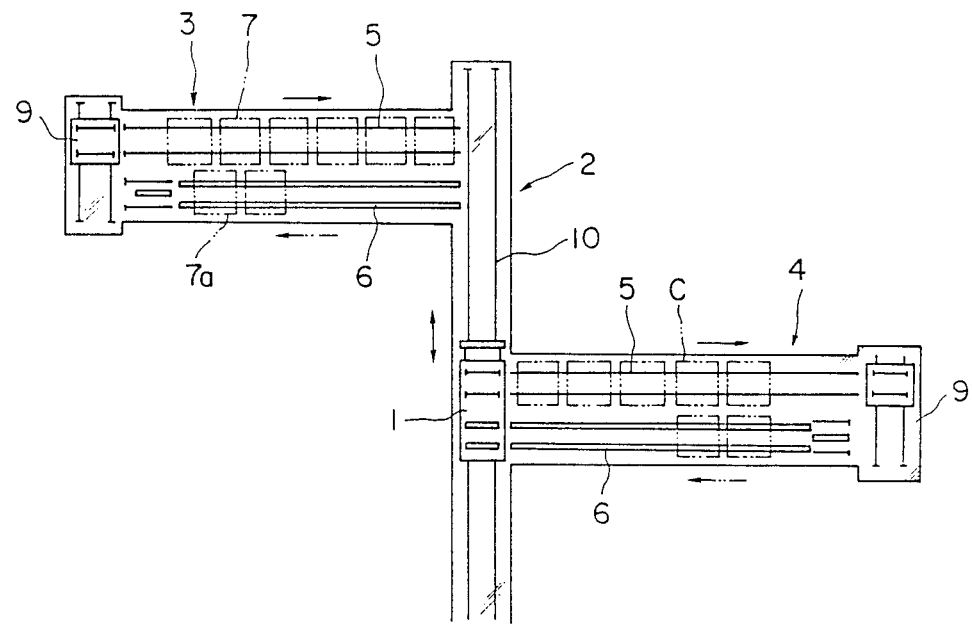
FIG. 1 is a schematic plan view of a simplified version of a conveying system in accordance with the invention.

FIG. 1, which illustrates a layout in accordance with the invention, shows a lateral-feed conveyor 2 on which travels a high speed, electrically driven lateral feed car 1. Lateral-feed conveyor 2 extends adjacent to the termination end of a first carrier transporting conveyor 3 and also adjacent to the starting end of a second carrier transporting conveyor 4. It should be understood that the lateral feed conveyor may have associated with it many additional carrier transporting conveyors corresponding to conveyors 3 and 4. Each of the carrier transporting conveyors 3 and 4 comprises a storage conveyor section 5 and an empty carrier return section 6. The direction of movement of loaded carriers 7 is indicated by the arrow with a solid shaft and the direction of movement of the empty carriers 7a is indicated by the arrow with the shaft shown as a broken line.

Figure 2:
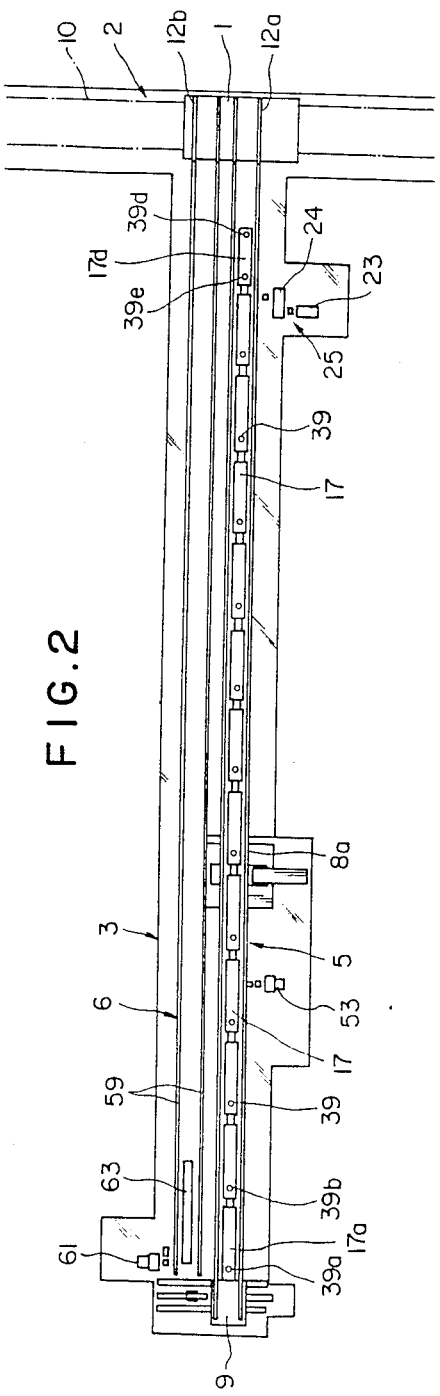
FIG. 2 is a schematic plan view of a transporting conveyor for coil transporting carriers.
Figure 3:
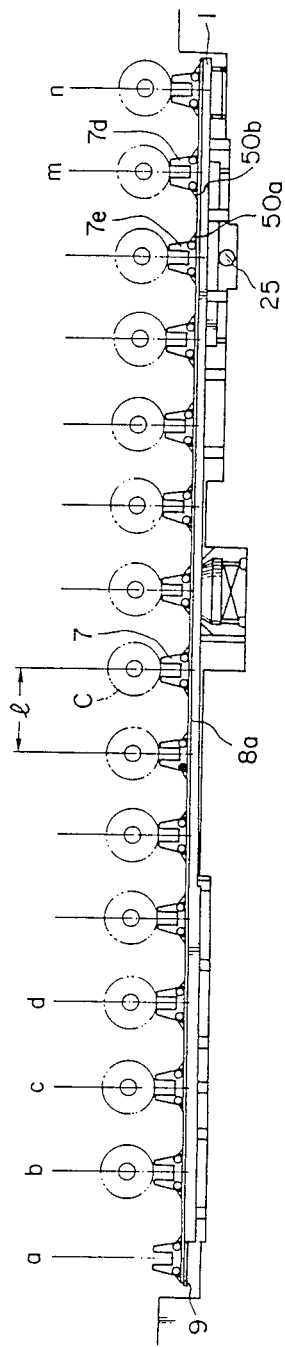
FIG. 3 is a schematic elevational view of the transporting conveyor of FIG. 2, showing a series of coil carriers.

As shown in FIGS. 2 and 3, the storage conveyor section 5 comprises a shuttle conveyor. The starting end of track 8a in storage conveyor section 5 and the termination end of return section 6 are served by a traverser 9, which moves carriers from the return section to the storage conveyor section. The termination end of track 8a of the storage conveyor section 5 and the starting end of return conveyor section 6 are located adjacent to track 10 of the lateral feed conveyor 2, on which travels the electrically driven lateral feed car 1. The lateral feed car 1 can be positioned on its track 2 so that rails 12a on the car are aligned with return conveyor section 6 and a drive roller conveyor 12b on the car is at the same time aligned with storage conveyor section 5.

Figure 4:
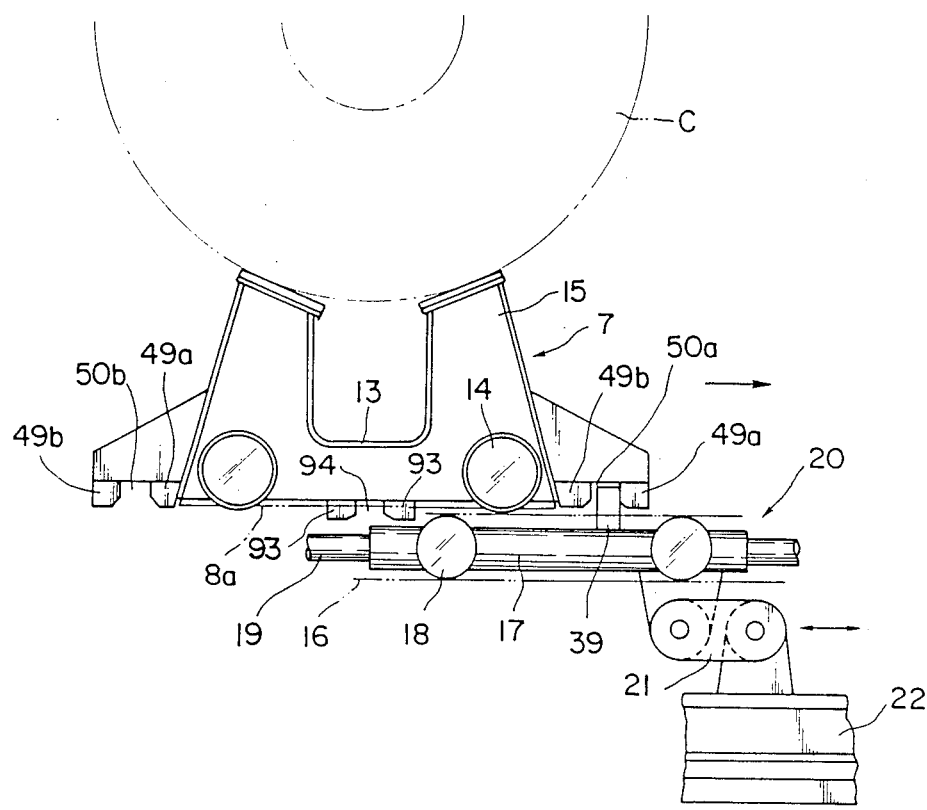
FIG. 4 is an elevational view showing a coil carrier, a driving frame, and the relationship between them.

As shown in FIG. 4, a carrier 7 travels on track 8a by means of flanged wheels 14, there being fore and aft wheels on both of the outer sides of a carrier frame 13. Rests 15 are provided on the upper part of frame 13 to support a coil C.

Below and parallel to track 8a there is provided a second track 16 comprising two parallel channels which receive the rollers 18 of driving frames 17. The driving frames are connected with one another by a rod 19 to form a single connected body 20 with the frames disposed at a pitch l, which is larger that the length of the carrier 7.

As shown in FIG. 4, driving frame 17 is connected through a link 21 to a rack 22. The rack is guided and supported for horizontal movement in a fixed guide groove parallel to track 16, and is driven through a pinion (not shown) by a drive device 25 (FIGS. 2 and 3) comprising a motor 23 and a reduction gear 24. The driving mechanism produces reciprocating movement of the driving frames with a stroke equal to or slightly larger than pitch l. Reciprocating movement of the driving frames moves each carrier through a succession of stop positions a, b, c...n. Stop position "a" coincides with the path of traverser 9, and stop position "n" coincides with the centerline of the lateral feed car 1 of conveyor 2.

Figure 5:
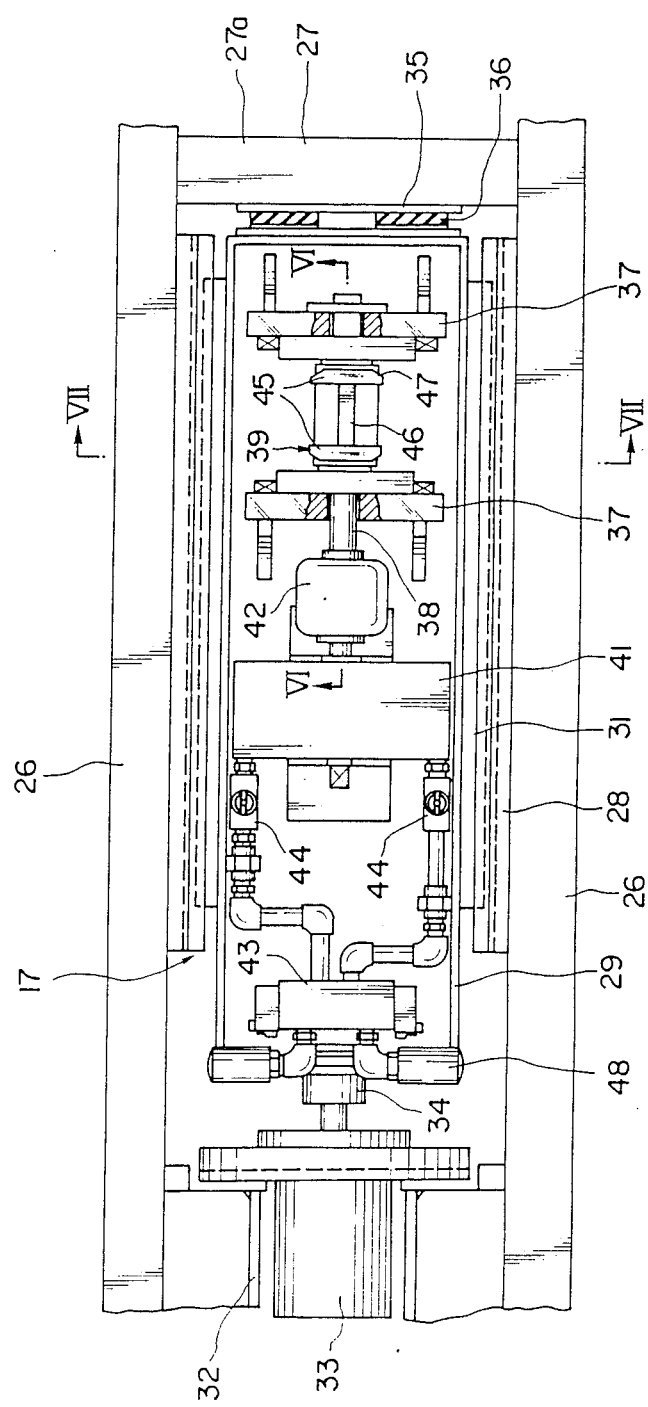
FIG. 5 is a top plan view of a driving frame.
Figure 6:
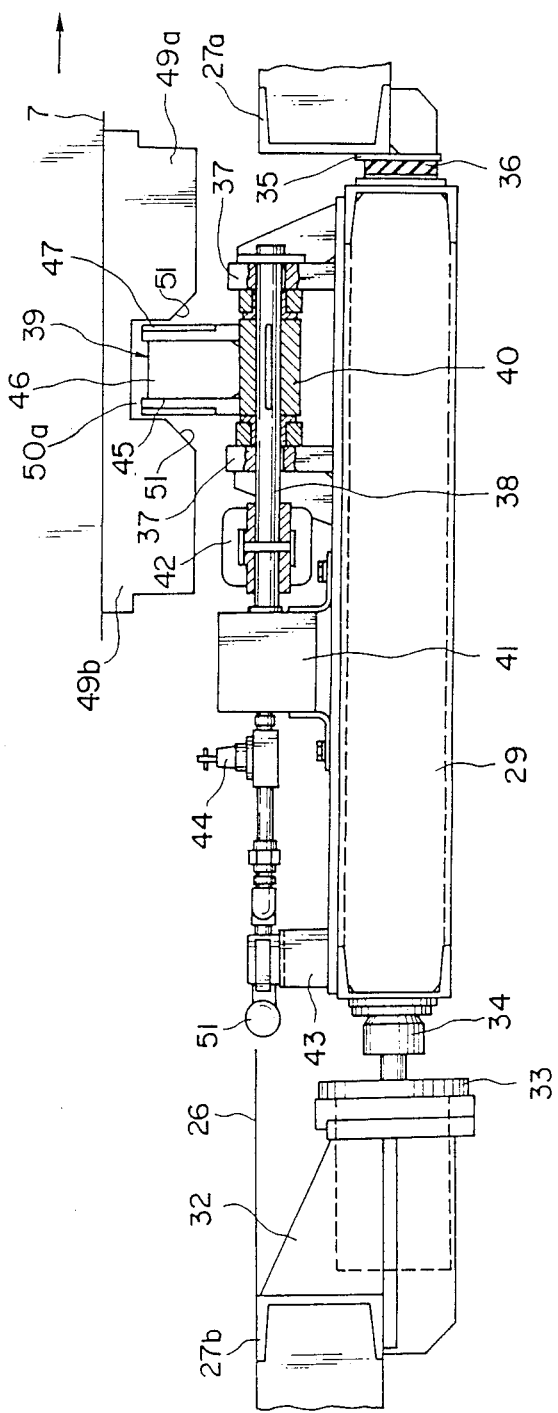
FIG. 6 is an elevational view of the driving frame of FIG. 5, partly in section through plane VI—VI of FIG. 5, and also showing, in fragmentary form, a part of a coil carrier engaged with the driving frame.
Figure 7:
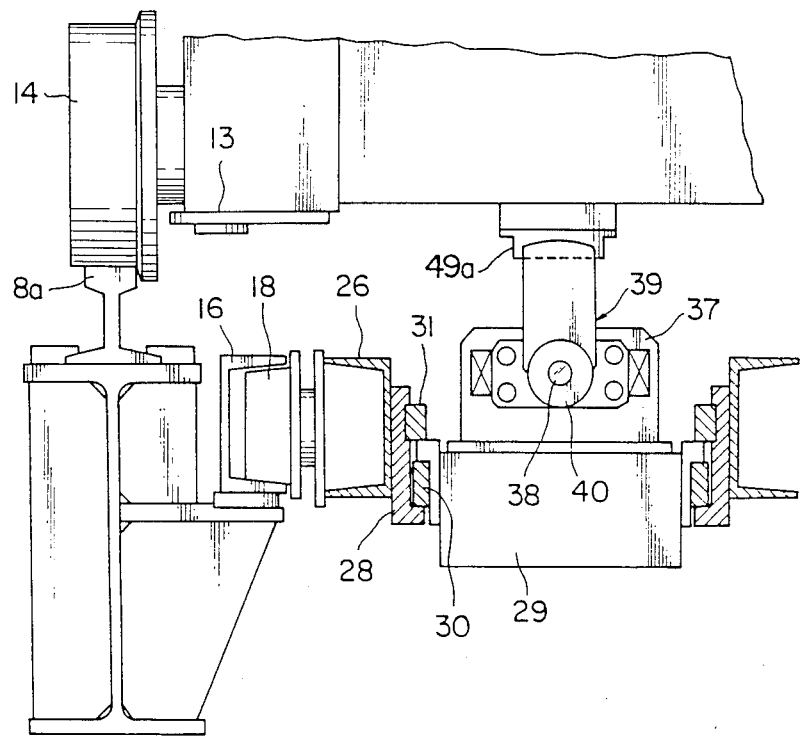
FIG. 7 is a fragmentary sectional view taken on plane VII—VII of FIG. 5.

Driving frame 17, shown in greater detail in FIGS. 5–7, comprises a lateral member 27 integrally secured to a longitudinal member comprising left and right channels 26. A roller 18, which is one of four rollers associated with each driving frame, is secured to one of channels 26, and is engaged with one of the channels of track 16, as shown in FIG. 7, so that the driving frame 17 is guided in track 16 for reciprocating movement.

As shown in FIGS. 5, 6 and 7, between the front and rear lateral members 27a and 27b of the driving frame, there is secured a rail member 26 having an L-shaped cross-section. Member 28 is located on the interior-facing side of one of channels 26, and a similar L-shaped member is located on the opposite side, as indicated in FIG. 7. An intermediate frame 29 is slidably supported between the L-shaped rail members on a rail member 30 on one side, and a similar rail member on the opposite side. A key 31, located above rail member 30, prevents the intermediate frame from moving upwardly away from rail member 30. A similar key is provided to hold down the opposite side of intermediate frame 29.

A hydraulic damper 33 is mounted on lateral frame member 27b by a bracket 32. A rod 34 of the damper is urged against the rear end of intermediate frame 29 by means of an internal spring (not shown). The forward end of intermediate frame 29 is provided with rubber cushions 36 which are urged into contact with a plate 35 mounted on lateral member 27a of the driving frame (FIGS. 5 and 6). A longitudinal shaft 38 is supported by a pair of bearings 37 located on the upper side of intermediate frame 29 near its forward end. A portion 40 of a radially protruding engaging pin 39 is keyed to shaft 38. Shaft 38 is rotatable by a rotary actuator 41 on frame 29 through a chain coupling 42 so that engaging pin is movable between an upright position for engaging a carrier and a horizontal disengaged position. The rotary actuator is operated by compressed air supplied from a pipe (not shown) provided on one of the longitudinal channels 26. The compressed air pipe is connected to an external source of compressed air through a flexible pipe (not shown). Compressed air is delivered to the rotary actuator 41 through an electromagnetically operated valve 43 and speed controllers 44. Silencers are provided on valve 43, one being indicated at 48 in FIG. 5.

The engaging pin 39 is constructed with front and rear engaging plates 45 extending radially from shaft 38 and with their principal faces substantially perpendicular to the axis of shaft 38. These front and rear plates are connected by a reinforcing plate 46. The front and rear plates have bevelled edges forming inclined planes 47.

Engaging elements 49a and 49b project downwardly from carrier 7, as shown in FIG. 4, to provide front and rear engaging recesses, 50a and 50b respectively, for receiving the engaging pins of the driving frames. The engaging elements at the forward end of the carrier are shown in detail in FIG. 6. The upper portions of the opposed surfaces of the engaging elements 49a and 49b are vertical, while the lower portions have inclined planes 51 disposed at approximately 45° relative to the vertical in order to provide a flared entry portion.

The operation of the storage conveyor proceeds as follows. When an empty carrier 7a is moved toward track 8a by traverser 9, the connected body 20 of driving frames 17 moves rearwardly through a distance L and stops. The rearmost driving frame 17a (FIG. 2) has no damper, but has engaging pin 39a which is rotated from its horizontal condition to its upright condition. In this case, if the length of the stroke L is set slightly larger than pitch l, engaging pin 39a may be located rearward of recess 50a when the engaging pin begins to rotate toward its upright position. Consequently pin 39 may engage the lower part of element 49b (FIGS. 4,6). However, as the engaging pin is actuated by compressed air, this causes no problems. As the driving frame moves forward, the engaging pin slides on the underside of element 49b and then enters recess 50a and engages with element 49a. The carrier 7 is then moved by the driving frame to position b (FIG. 3) whereupon the engaging pin 39a is rotated out of engagement with recess 50a. When the body 20 of connected driving frames reciprocates again, the engaging pin 39b on the next driving frame is engaged with, and disengaged from, recess 50a of carrier 7a so that the carrier is advanced to position c. Thereafter, the carrier 7a is advanced in a similar manner by the engaging pins 39 of the successive driving frames 17.

Coils C are loaded onto the empty carrier 7a at position b or d by means of a crane or other loading device.

Thereafter, the loaded carrier is advanced in steps through lengths l by engagement and disengagement of pins 39. The shock which occurs when the carrier starts moving is relieved by hydraulic damper 33 (FIG. 6), and, during the advancing movement, the intermediate frame ? 9 is forced back to its normal position in the driving frame by the spring (not shown) within the damper 33.

When the body 20 of connected driving frames decelerates upon approaching the limit of its advancement, the inertia of carrier 7 causes element 49b to urge the engaging pin 39 forwardly (FIG. 6), and the resulting forward movement of the intermediate frame 29 is cushioned by rubber cushions 36.

Figure 8:
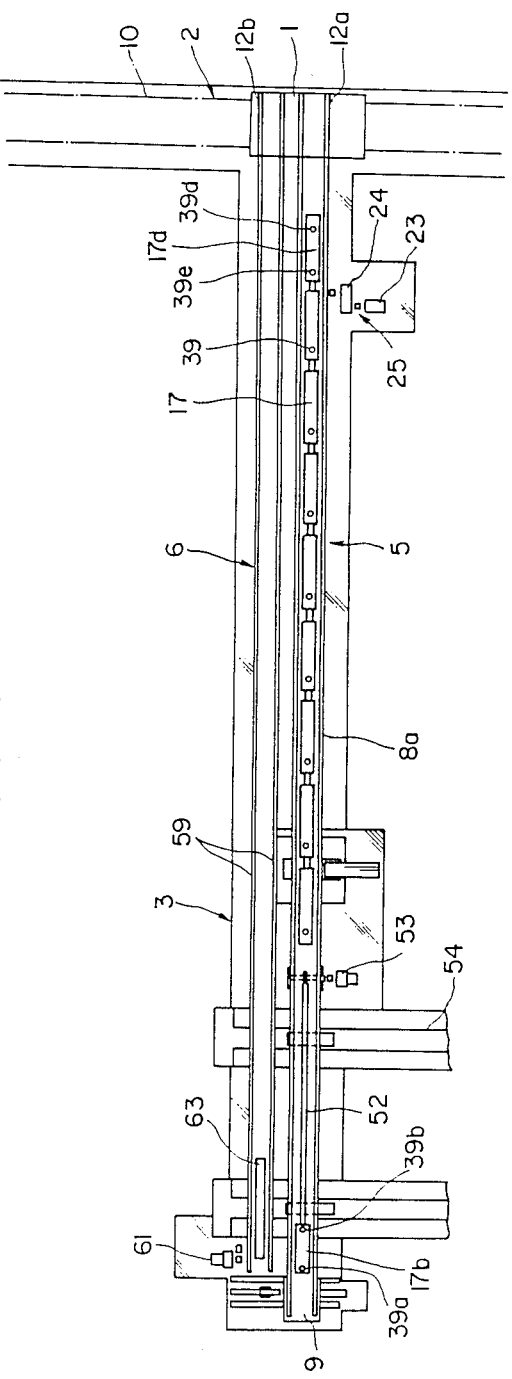
FIG. 8 is a schematic fragmentary plan view showing an alternative embodiment of a carrier transporting conveyor.

In the embodiment of the conveyor shown in FIG. 8, the storage conveyor section 5 is shorter than the return section 6, and a driving frame 17b, separate from the connected body of driving frames, is situated at the rear of conveyor section 5 and driven by a drive chain 52, which is connected both to the front and rear of frame 17b in order to move it both forwardly and rearwardly. The chain 52 is driven by a motor 53, and is able to move the driving frame 17b forwardly to the position of track 54 where a coil is loaded onto a carrier from a c-shaped coil car.

Figure 9:
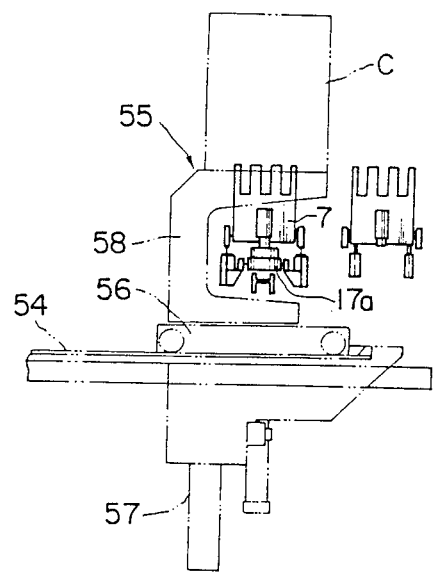
FIG. 9 is a schematic elevation of a C-shaped coil car used for loading and unloading carriers in the embodiment of FIG. 8.

The C-shaped coil car 55, which is a well-known device, is shown in FIG. 9. It comprises a C-shaped bed 58, which is moved up and down by a hydraulic cylinder on a carrier 56 which travels on track 54. Carriers 7 are moved into the recess of the C-shaped coil car by driving frame 17a and coils C are loaded onto the carriers by doWnWard moVement of the C-shaped bed 58.

The C-shaped coil car may, of course, be use to unload coils from the carrier, in which case a structure corresponding to driving frame 17b and chain 52 is provided at the forward end of a storage conveyor.

Figure 10:
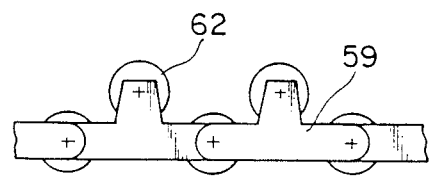
FIG. 10 is a fragmentary elevation of a top roller chain used in the return conveyor sections of the carrier transporting conveyors.
Figure 11:
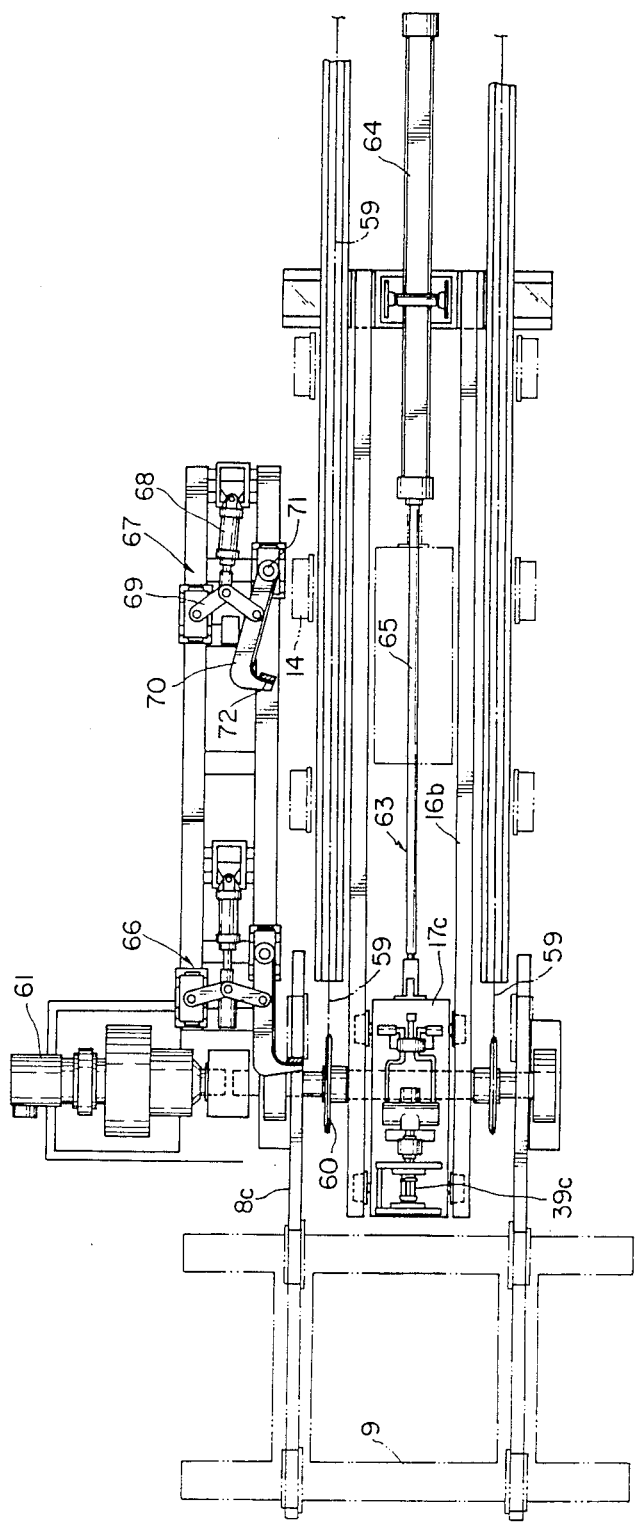
FIG. 11 is a top plan view of a feeder for empty carriers.

The return conveyor section 6 for empty carriers comprises two endless "top roller" chains 59 (FIGS. 2, 8, 11 and 12), which are driven by a motor 61 through sprockets 60. As shown in FIG. 10, a top roller 62 is provided on the chain. This top roller supports lower surfaces of the carrier frame 13 (FIG. 4), the chains 59 being located internally relative to carrier wheels 14, as shown in FIG. 11. The chains 59 move the empty carrier 7a (FIGS. 1 and 12) toward the location of an empty carrier feeder 63 (FIGS. 2, 8, 11 and 12). The empty carrier feeder causes the empty carrier 7a to be transferred onto track 8c (FIG. 11) and onto the traverser 9.

Figure 12:
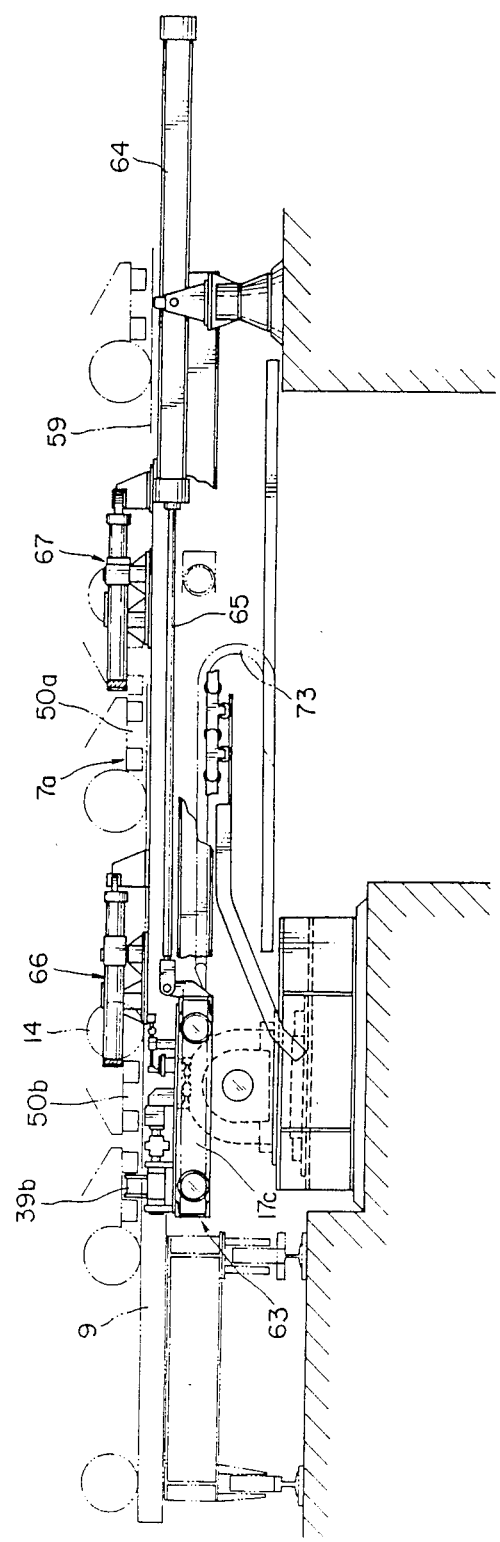
FIG. 12 is an elevational view of the carrier feeder of FIG. 11.

As shown in FIGS. 11 and 12, the empty carrier feeder 63 comprises a trunnion-supported air cylinder 64 having a rod 65 connected to a driving frame 17c. The driving frame 17c is similar in construction to the driving frames previously described, and is moved on track 16b by rod 65. An engaging pin 39c on driving frame 17c is movable into one of recesses 50a and 50b on the underside of the coil carrier to advance the carrier onto traverser 9.

To insure engagement of pin 39c with the recess on the underside of the empty coil carrier, stops are provided at 66 and 67 alongside the path of the carriers. These stops engage the carriers and stop them at the desired positions while the top roller chain continues to advance. Each stop has an arm 70 which is pivoted about a vertical axis at a pivot 71, and is operated by an air cylinder 68 having a base pivoted to a fixed member and a piston operating a toggle structure 69 connected to an intermediate point on arm 70. A bent portion located at the forward end of arm 70 is engageable with, and disengageable from, the forward side of a carrier wheel 14. With both arms 70 extended, two carriers can be stopped near the end of the return conveyor 6 at which the traverser is located.

In operation of the return conveyor, the forward stop 66 is first opened, and the carrier 7a nearest the traverser 9 is advanced by driving frame 17c and transferred onto the traverser. Stop 66 is then closed and stop 67 opened so that the next carrier 7a is moved to the position of stop 66. Stop 67 is closed immediately after it is cleared by the carrier which it releases. This operation is repeated in order to transfer carriers sequentially onto traverser 9.

In FIG. 12, there is shown a flexible supporting sheath 73, which carries control cables and a compressed air supply hose to the driving frame 17c.

Figure 13:
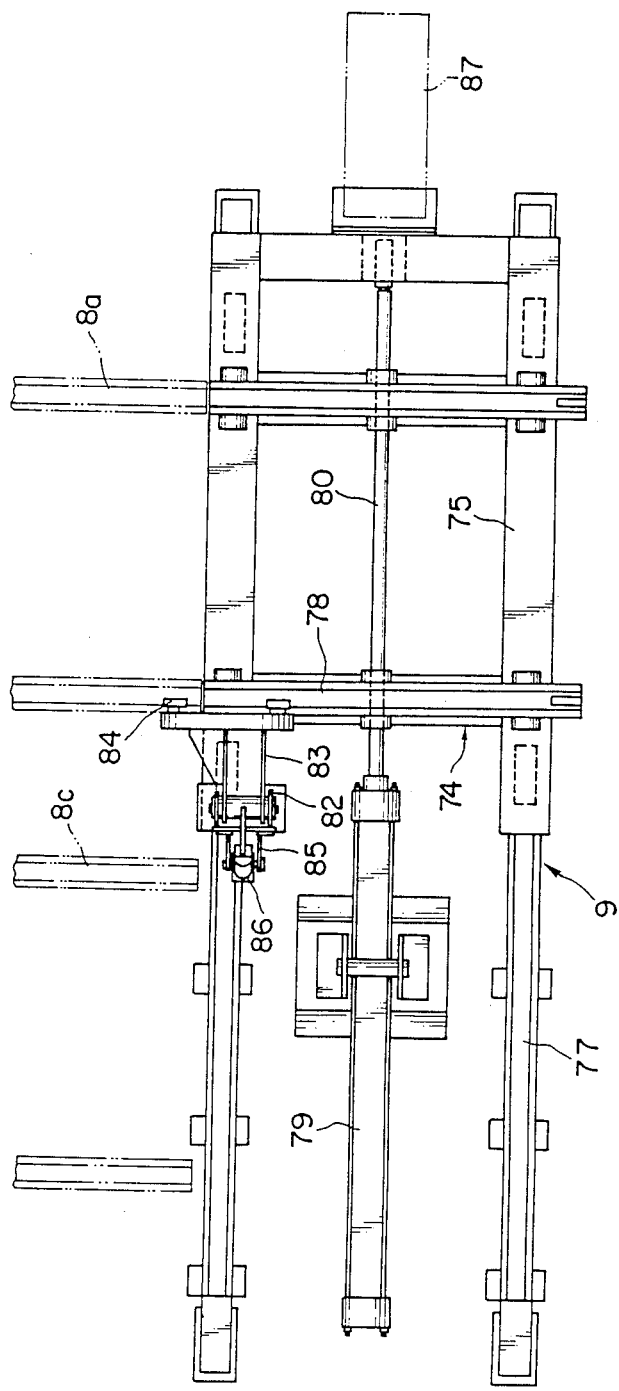
FIG. 13 is a top plan view of a traverser in accordance with the invention.
Figure 14:
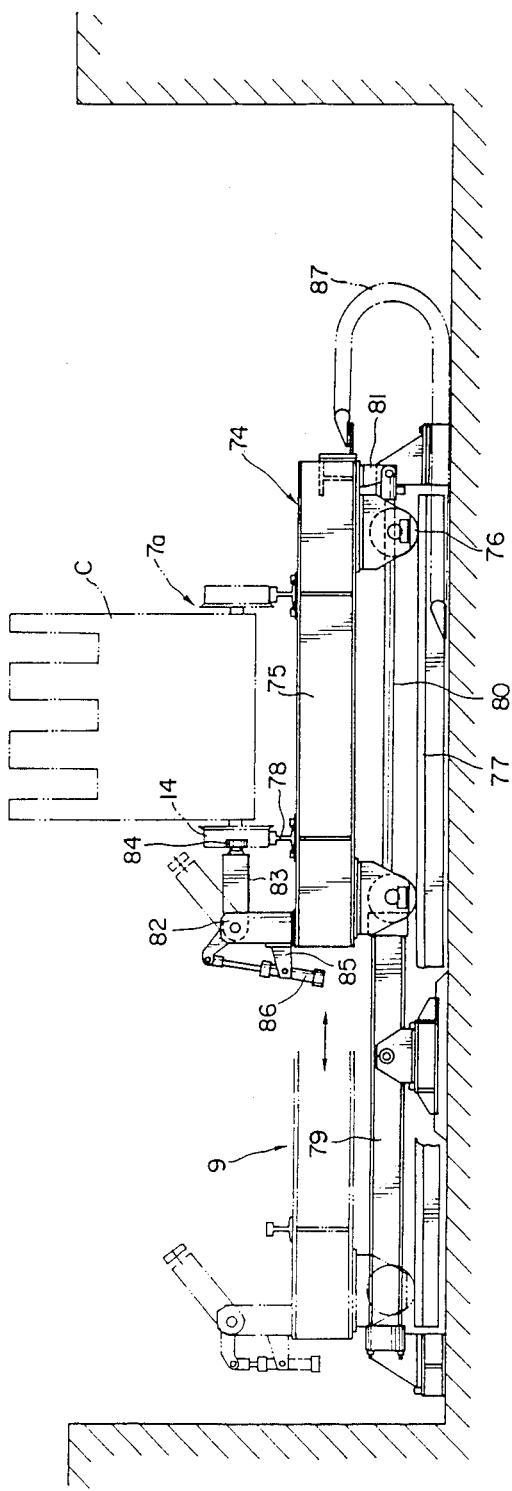
FIG. 14 is a side elevation of the traverser of FIG. 13.
Figure 15:
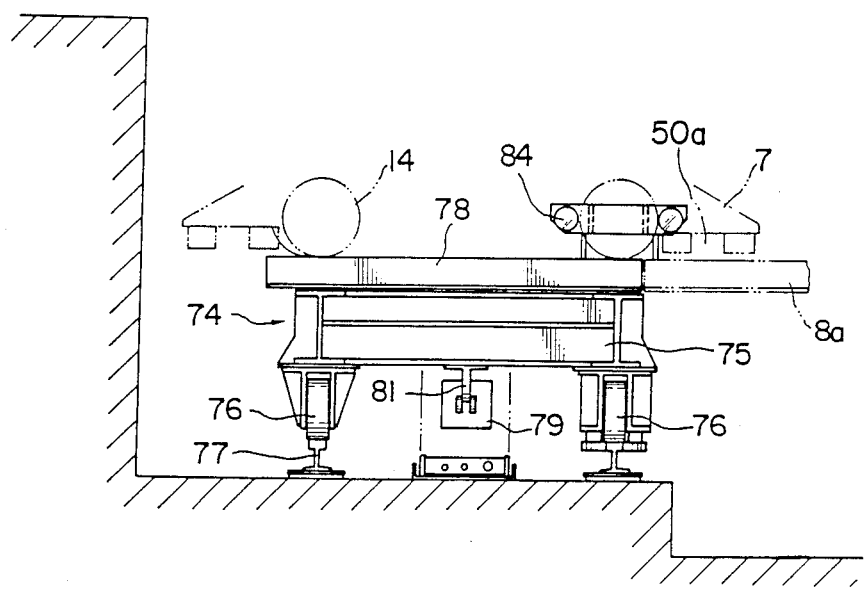
FIG. 15 is an end elevation of the traverser of FIG. 13.

FIGS. 13-15 shoW the details of the traverser 9, which comprises a carrier 74 which moves along a plastic track 77 located on and secured to a floor below the level of track 8a and extending perpendicular to the direction of track 8a. The carrier 74 travels on wheels 76 mounted on the underside of a frame 75. A track 78 is provided on the upper side of frame 75 and is alignable alternately with track 8a of the storage conveyor section 5 and with track 8c of the return conveyor section. Carrier 74 is moved from one track to the other by a piston and cylinder comprising air cylinder 79 and rod 80, the cylinder being connected to the floor between the rails of track 77, and the rod being connected by means of a bracket 81 to frame 75. A bracket 82 (FIG. 14) is secured to the frame on one side of the frame-carried track 78. Rollers 84 are provided on an arm 83 pivoted on bracket 82, and are engageable with both sides of a carrier wheel 14. Arm 83 is moved about its pivot by an air cylinder 86, which is pivoted in a bracket 85. When the arm 83 is in its horizontal position, the rollers 84 embrace the carrier wheel, thereby holding the carrier in a fixed position on track 78 of the traverser. When the arm 83 is lifted, the carrier is free to roll onto or off track 78. As shown in FIG. 14, a supporting sheath is provided at 87 for a compressed air hose and control cables.

Figure 16:
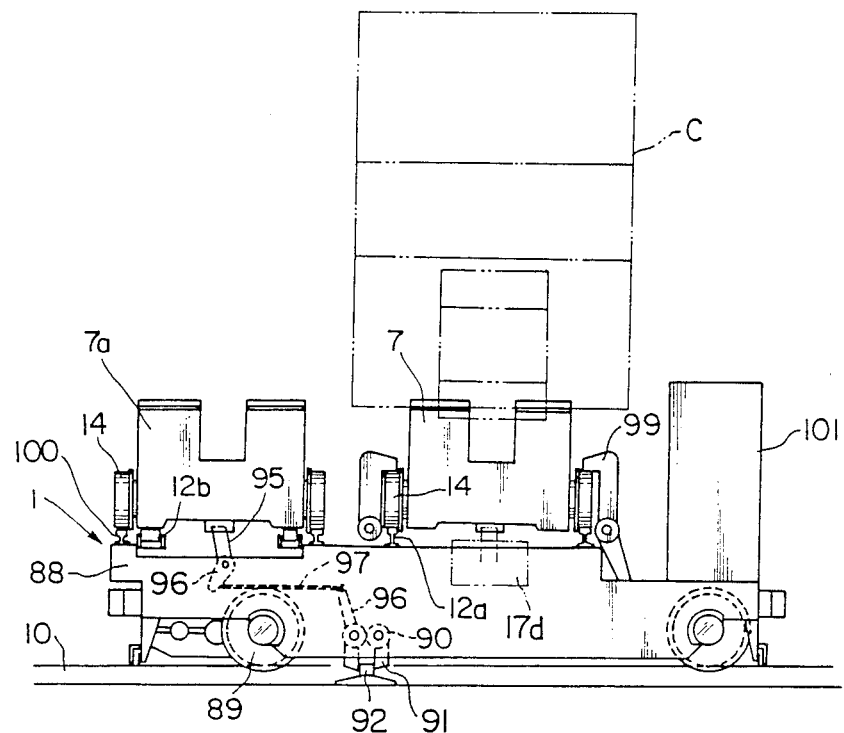
FIG. 16 is an elevational view of a high speed, electrically driven carrier used as a lateral feed conveyor in accordance with the invention.

FIG. 16 shows the electrically driven lateral feed car 1, which is operated by a built-in motor on track 10 of the lateral conveyor 2. The lateral feed car travels on wheels 89, which are mounted on a frame 88. The lateral feed car has a track 12a which is alignable with a top roller chain 59 of an empty carrier conveyor 6, and also has a driving roller conveyor 12b alignable with the track of a storage conveyor section 5. When the lateral feed car is positioned with its track 12a aligned with an empty carrier conveyor 6, and with its driving roller conveyor 12b aligned with the track of a storage conveyor section 5, carriers can be transferred onto and off both sections of the lateral feed car, so that carriers can be transferred betWeen conveyor sections 5 (FIG. 1) and between conveyor sections 6 (FIG. 1).

To locate and stop the lateral feed car I for transfer of carriers, arms 91, secured to shafts of a pair of meshed gears 90, are provided to grip a locating projection 92 secured to the floor underneath the lateral feed car. The upper end of a link 95 fits into a recess 94 (FIG. 4 on the underside of a carrier between two engaging elements 93. Link 95 stops empty carriers 7a at a fixed position on the lateral feed car. The lower end of link 95 and an arm 96 secured to the shaft of one of gears 90 are connected by a link 97 so that the lateral feed car and the empty carrier are simultaneously locked.

Transfer of a loaded carrier 7 onto the lateral feed car 1 is carried out by driving frame 17d (FIG. 2) at the transport end of storage conveyor section 5. The upper surface of driving frame 17d is provided with an engaging pin 39d which engages the rear engaging recess 50b of the foremost carrier 7d (FIG. 3) in order to push carrier 7d onto the lateral feed car. Driving frame 17d also has an engaging pin 39e which is engageable with the front engaging recess 50a of the next carrier 7e in order to pull carrier 7e . As the body 20 of connected driving frames advances, carrier 7d is transferred to lateral feed car 1 by the pushing action of pin 39d , and at the same time, the next carrier 7e is moved to the position previously occupied by carrier 7d by the pulling action of engaging pin 39e . To insure that lateral feed car 1 may move immediately after the transferring action, recess 50a is provided above rail 8a and is open in the travelling direction of the lateral feed car.

In the case in which a loaded carrier 7 is unloaded from the lateral feed car I, engaging pins 39d and 39e are also operative. The loaded carrier is taken off the lateral feed car at the transport end of a storage conveyor, but the storage conveyor section 5 and the empty carrier return conveyor section operate in directions opposite to the directions in which they would operate at a location where a loaded carrier is moved onto the lateral feed car.

Referring to FIG. 16, in order to hold the loaded carrier 7 on the lateral feed car 1, in a stable manner, a fork 99 is provided, having an inwardly bent, forked upper end. This fork is operated by a linear actuator (not shown) and engages the upper side of the carrier wheel 14. Forks may be provided on both sides of the carrier.

As shown in FIG. 16, guide rails 100 are provided to prevent lateral displacement of the empty carrier 7a.

Electrical power for the lateral feed car is supplied through sliding contact between a collector (not shown) on one side of frame 88 and an electrical contact rail provided alongside track 10. A control panel is provided at 101 on the lateral feed car.

In the operation of the conveying apparatus described above, a coil C is loaded at the starting end of storage conveyor section 5 of a conveyor 3 (FIG. 1). The coil C is loaded onto an empty carrier 7a after it is transferred by the traverser 9 from the return conveyor section 6 to storage conveyor section 5. The loaded carrier is followed closely by other loaded carriers on conveyor section 5. When it reaches the transport end of the conveyor section 5, it is transferred to track 12a of the high speed, electrically driven lateral feed car 1. At the same time, an empty carrier 7a may be transferred from the lateral feed car onto return conveyor 6. When the lateral feed car arrives at carrier transporting conveyor 4, the loaded carrier is transferred onto conveyor section 5 and another empty carrier 7a is loaded onto the lateral feed car from the carrier return section 6 of conveyor 4. Each coil C is moved throughout the system together with its carrier 7, and consequently information on the coil need not be transferred from one memory to another each time the coil is transferred from one conveyor to another. It is sufficient, and simpler to transfer the carrier identification number.

In case coils arrive more rapidly than usual at the loading station of conveyor 3, the conveyor section 5 serves as a buffer, insuring smooth flow of work through the system. The conveyor section 5 of transport conveyor 4 performs a similar buffering function. At the same time an oversupply or shortage of empty carriers can be accommodated by lateral feed of empty carriers by the high speed lateral feed car.

The advantages of the invention may be summarized as follows.

First, the buffer function of the storage conveyor allows the flow of coils to be flexible and smooth, and loading and unloading of coils by means of cranes or similar transfer devices can be carried out independently at the loading and unloading stations. Secondly, since coils remain with their carriers as they are transferred between conveyors, coil information can be positively and simply transferred by reference to carrier identification numbers. This facilitates conveyance of coils to the desired locations.

Third, all of the conveyors operate in substantially a single plane, and the transfer of coils to and from a C-shaped coil car is simple in comparison with transfer in a walking beam or chain conveyor. Thus, the invention results in reduced equipment costs and saving of energy.

Fourth, since coils are conveyed together with their carriers, coils are not likely to be damaged when they are transferred from one conveyor to another. A carrier cleaner may be provided, in which case both oiled and non-oiled coils may be transported in the system without contaminating the non-oiled coils.

Fifth, high efficiency is achieved, and maintenance reduced by the use of electricity and compressed air to power the conveyor system in preference to oil, where pressure loss is likely to result in maintenance problems and reduced efficiency.

I claim:

1. A conveying system for heavy articles comprising at least two storage conveyors, a lateral-feed conveyor extending from a terminal end of one of the storage conveyors to a starting end of another of said storage conveyors, and a plurality of carriers movable along said storage conveyors and transportable by said lateral feed conveyor between said storage conveyors, wherein at least one of said storage conveyors comprises reciprocating driving frame means, having means selectively engageable with said carriers, for moving said carriers along said one of said storage conveyors in steps by repeatedly engaging carriers on said one storage conveyor while the driving frame means is in a first position, moving the carriers forwardly along said one storage conveyor until the driving frame means reaches a second position, disengaging the carriers, and returning to said first position.

2. A conveying system according to claim 1 in which each of said storage conveyors has reciprocating driving frame means.

3. A conveying system according to claim 1 in which the carriers are of uniform length and in which the engaging means of said drive frame means are disposed uniformly along the length of the drive frame means at a pitch greater than the length of one of said carriers and the reciprocating movement of the drive frame means takes place through a distance equal to or slightly greater than said pitch.

4. A conveying system for heavy articles comprising a first transporting conveyor, a second transporting conveyor, a lateral feed conveyor connecting one end of the first transporting conveyor with one end of the second transporting conveyor, and a plurality of carriers movable along the first and second transporting conveyors and transportable by said lateral feed conveyor from one transporting conveyor to the other, each transporting conveyor comprising a storage conveyor section for carriers, a return conveyor section for carriers, both sections extending parallel to each other and having terminations adjacent to the path of the lateral feed conveyor, and traverser means remote from said terminations for transferring carriers from one section of the transporting conveyor to the other, in which the storage conveyor section of said first transporting conveyor includes means for transporting loaded carriers toward said lateral feed conveyor, in which the return conveyor section of said second transporting conveyor includes means for transporting empty carriers toward said lateral feed conveyor, and in which the lateral feed conveyor comprises a track and a lateral feed car movable along said track, said lateral feed car having means alignable with the storage conveyor of said first transporting conveyor for carrying a loaded carrier, and means alignable at the same time with the return conveyor section of said first transporting conveyor for carrying an empty carrier.

5. A conveying system comprising a first transporting conveyor, a second transporting conveyor, a lateral feed conveyor connecting one end of the first transporting conveyor with one end of the second transporting conveyor, and a plurality of carriers movable along the first and second transporting conveyors and transportable by said lateral feed conveyor from one transporting conveyor to the other, each transporting conveyor comprising a storage conveyor section for carriers, a return conveyor section for carriers, both sections extending parallel to each other and having terminations adjacent to the path of the lateral feed conveyor, and traverser means remote from said terminations for transferring carriers from one section of the transporting conveyor to the other, in which the lateral feed conveyor comprises a track and a lateral feed car movable along said track, said lateral feed car having means alignable with the storage conveyor section of each transporting conveyor for carrying a first carrier, and means alignable at the same time with the return conveyor section of the same transporting conveyor for carrying a second carrier.

6. A conveying system according to claim 5 including power-driven means for transferring carriers between the transporting conveyors and said lateral feed car.

7. A conveying system according to claim 5 including power-driven means for transferring carriers between the storage conveyor section of each transporting conveyor and the traverser means thereof.

8. A conveying system according to claim 5 including power-driven means for transferring carriers between the return conveyor section of each transporting conveyor and the traverser means thereof.

9. A conveying system according to claim 4 in which the storage conveyor section of the first transporting conveyor comprises means for moving carriers thereon toward the end thereof connected to the lateral feed conveyor, the return conveyor section of the first transporting conveyor comprises means for moving carriers thereon away from the end thereof connected to the lateral feed conveyor and toward the traverser means of the first transporting conveyor, the storage section of the second transporting conveyor comprises means for moving carriers thereon away from the end thereof connected to the lateral feed conveyor and toward the traverser means of the second transporting conveyor, and the return conveyor section of the second transporting conveyor comprises means for moving carriers thereon toward the end thereof connected to the lateral feed conveyor.

10. A conveying system for heavy articles comprising a first transporting conveyor, a second transporting conveyor, a lateral feed conveyor connecting one end of the first transporting conveyor with one end of the second transporting conveyor, and a plurality of carriers movable along the first and second transporting conveyors and transportable by said lateral feed conveyor from one transporting conveyor to the other, each transporting conveyor comprising a storage conveyor section for carriers, a return conveyor section for carriers, both sections extending parallel to each other and having terminations adjacent to the path of the lateral feed conveyor, and traverser means remote from said terminations for transferring carriers from one section of the transporting conveyor to the other, in which the storage conveyor section of at least one of said transporting conveyors comprises reciprocating drive frame means having means selectively engageable with the carriers thereon for moving the carriers along said storage conveyor section in steps.

11. A conveying system for heaving articles according to claim 10 in which the means selectively engageable with carriers thereon for moving carriers along said storage conveyor section in steps moves said carriers by repeatedly engaging carriers on the storage conveyor section while the driving frame means is in a first position, moving the carriers along said storage conveyor section until the driving frame means reaches a second position, disengaging the carriers, and returning to said first position.

12. A conveying system for heavy articles according to claim 11 in which the carriers are of uniform length and in which the engaging means of said drive frame means are disposed uniformly along the length of the drive frame means at a pitch greater than the length of one of said carriers and the reciprocating movement of the drive frame means take s place through a distance equal to or slightly greater than said pitch.

13. A conveying system for heavy articles according to claim 11 in which the storage conveyor section of each of said transporting conveyors comprises reciprocating drive frame means having means selectively engageable with carriers thereon for moving carriers along said storage conveyor section in steps by repeatedly engaging carriers on the storage conveyor section while the driving frame mans is in a first position, moving the carriers along said storage conveyor section until the driving frame means reaches a second position, disengaging the carriers, and returning to said first position.

14. A conveying system for heavy articles according to claim 13 in which the carriers are of uniform length and in which the engaging means of said drive frame means are disposed uniformly along the length of the drive frame means at a pitch greater than the length of one of said carriers and the reciprocating movement of the drive frame means takes place through a distance equal to or slightly greater than said pitch.

* * * * *